United States Patent [19]

Allievi

[11] 3,846,908
[45] Nov. 12, 1974

[54] CLAM, OYSTER AND NUT CRACKER

[76] Inventor: Joseph Allievi, 4610 Pleasure Dr., Holiday, Fla. 33589

[22] Filed: Oct. 24, 1973

[21] Appl. No.: 409,321

[52] U.S. Cl............... 30/120.1, 7/1 A, 17/75, 30/120.3
[51] Int. Cl............................. B26b 13/06
[58] Field of Search........... 30/120.3, 120.5, 120.1, 30/120.2, 120.4; 7/1 A, 1 B, 3 R, 5.4, 5.5, 4, 14.1 R; 17/75

[56] References Cited
UNITED STATES PATENTS

| 133,267 | 11/1872 | Starin | 7/1 A |
|---|---|---|---|
| 708,014 | 9/1902 | Blagden | 17/75 |
| 715,988 | 12/1902 | Cooley et al. | 17/75 |
| 888,738 | 5/1908 | Proctor | 30/120.4 |
| 1,922,884 | 8/1933 | De Golyer | 30/120.4 |
| 2,473,608 | 6/1949 | Plock | 17/75 X |
| 2,596,382 | 5/1952 | Duke | 30/120.3 |
| 3,338,281 | 8/1967 | Davy | 30/120.4 |
| 3,685,097 | 8/1972 | Scott | 17/75 |
| 3,706,114 | 12/1972 | Waechter | 30/120.1 |
| D196,381 | 9/1963 | Basilotta | 17/75 X |

FOREIGN PATENTS OR APPLICATIONS

| 223,478 | 10/1924 | Great Britain | 7/1 A |
|---|---|---|---|
| 232,827 | 5/1959 | Australia | 30/120.3 |
| 12,651 | 0/1849 | Great Britain | 17/75 |
| 3,358 | 0/1894 | Great Britain | 17/75 |
| 321,064 | 10/1929 | Great Britain | 30/120.3 |
| 377,496 | 6/1964 | Switzerland | 30/120.3 |

Primary Examiner—Al Lawrence Smith
Assistant Examiner—J. T. Zatarga
Attorney, Agent, or Firm—Stein and Orman

[57] ABSTRACT

A hand manipulated tool or implement used to open shell-fish such as oysters, clams or the like and including first and second leg means having appropriate handles arranged in corresponding position thereon wherein the second leg means is pivotally attached to the first leg means at a point intermediate a blade portion of the first handle means. A curvilinear or arcuate portion is formed on the second handle means and includes a roughened or serrated edge used to grip the object being opened wherein the cutting edge of the blade and the serrated portion are substantially coplanar with one another so as to easily separate shell-fish or the like.

4 Claims, 3 Drawing Figures

PATENTED NOV 12 1974   3,846,908

CLAM, OYSTER AND NUT CRACKER

BACKGROUND OF THE INVENTION

1. Field of the Invention

This invention relates to a hand operated tool designed primarily to open oysters, clams or like shellfish through the use of oppositely disposed and pivotally attached legs which serve as levers in cooperative relation with one another and further wherein at least one of the legs or handles has a sharpened blade portion for cutting, prying, etc.

2. Description of the Prior Art

There has long been recognized a problem concerned with the opening or obtaining access to various foods such as shellfish, nuts and the like. As is well known, the edible portion of a shellfish can only be obtained after the outer shell is opened by separating or the like. When dealing with oysters, clams or like shellfish, a rather strong muscle binds or normally maintains the shell portions in a closed position. When it is desired to obtain the body or "meat" of the fish without cooking, separating of these shell portions can be quite difficult and frequently dissuades one from eating these shellfish in the raw state.

The same problem arises when one tries to obtain the "meat" of a nut or the like. When dealing with a nut or like product, frequently one resorts to the actual breaking of the shell which, more often than not, results in destruction or severe multilation of the meat thereby rendering it unedible.

Various tool and hand manipulated implements exist in the prior art and are now commercially available. Generally, the majority of these tools utilize one or more lever-handles pivotally or movably attached to one another in such a manner as to facilitate breaking of the shell or gripping the product in such a manner as to force opening of the shell by separating the shell parts. Implements used to open nuts are normally not concerned with the separating of the shell, but relay primarily on its inherent weakness and therefore, again attempts to obtain access to the meat by the breakage of the shell. These type of implements, of course, suffer from the inherent problems stated above, namely, damaging of the interior or meat of the product being opened.

Other hand manipulated implements commonly used incorporate some type of knife or blade and attempt to enter the shell by prying open the shell halves after wedging a portion of the implement therebetween.

While the vast majority of the known implements are of rather simple, rather uncomplicated structure, a great number of these prior art devices are basically inefficient since they do not obtain ready, quick and trouble free access to the interior of the shell as desired. In addition, more than one implement is often needed such as a knife or like tool for prying as well as pivotally connected levers for cracking or otherwise weakening the shell.

Accordingly, it can readily be seen that there is a need in the industry for a simple tool inexpensive to manufacure and maintain and being sufficiently durable to last over continued use under relatively adverse conditions. In addition, such a tool should be structured to efficiently open a shell so as to provide ready access to its interior while at the same time leaving the "meat" of the object on the interior of the shell undamaged.

SUMMARY OF THE INVENTION

The present invention relates to a hand operated tool designed primarily to open shellfish, nuts or like food products wherein it is desired to obtain the "meat" on the interior of a hard exterior shell normally being of two separabe portions.

More particularly, the device of the present invention comprises a first leg means being substantially elongated and including a blade portion integrally formed or securely attached thereto. A first handle means is mounted immediately adjacent or contiguous to the blade portion. The blade means itself has a sharpened cutting edge extending along the majority of the length of the peripheral edge facing the second leg means.

This second leg means is pivotally attached to the first leg means by means of a pivot connector. The pivot element is secured to the first leg means on the blade portion substantially intermediate to the ends of the blade portion. This pivot means is also connected to the extremity of the second leg means such that both the first and second leg means may serve as levers and apply force to any object positioned between these leg means. The second leg means further comprises a second handle means correspondingly positioned and generally configured to operatively cooperate with the first handle means on the first leg means.

A curvilinear or arcuate portion is defined between the second handle means and the extremity of the second leg means which is connected to the pivot point.

The inner peripheral edge may be considered a second cutting edge facing and blade and the first cutting edge on the blade of the first leg means. This second cutting edge may be roughened or formed into a serrated edge and thereby define a gripping means along a major portion thereof. In addition, this serrated edge defined on the arcuate portion of the second leg means is oriented in substantially co-planar relation with the cutting edge of the blade means. By virtue of this arrangement, a shellfish or like object can be positioned between the first and second leg means and forceably engaged between the cutting blade and the serrated edge of the curvilinear portion. By virtue of the fact that these two peripheral edges are in a substantially co-planar relationship, they can be positioned along a plane defined by the separation of the two shell halves. This will naturally facilitate separating of the shell halves and opening of the shell in that sufficient force can be directed between the shell halves through the advantage of the first and second leg means acting as levers pivoting about "fulcrum" defined by the pivot point.

The blade portion of the first leg means has a sufficient longitudinal dimension to extend beyond the pivot point and define a further extension of the cutting edge of the blade and a point. This portion of the blade can serve as a shucker or like device capable of further removing the interior of the shell once the shell is opened.

An additional structural feature of the present invention includes a cracking means in the form of one outwardly extending integral flange formed on each of the first and second handle means in corresponding location to one another. Each of these flanges are cooperatively located so as to come into abutting engagement with one another over a surface area thereof having a substantially constant longitudinal dimension. In addition, the surface area of each flange may be serrated or roughened to provide efficient gripping means. Again, these portions are primarily used for cracking, braking or otherwise applying pressure to given portions of a shell or object being opened.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawing.

DETAILED DESCRIPTION

Figure 1:
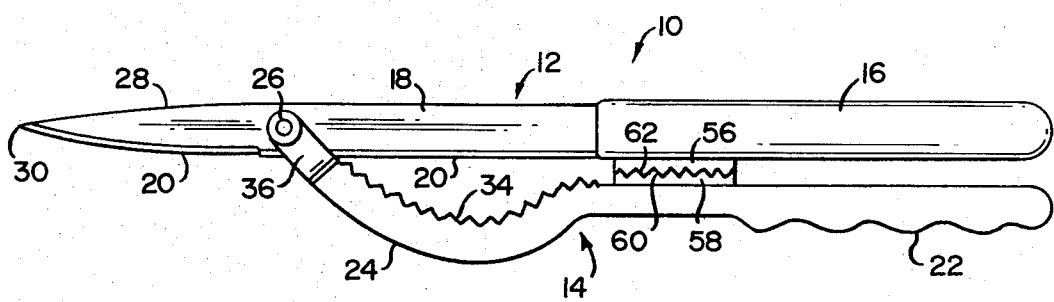
FIG. 1 is a front plan view of the opening device of the present invention in closed position.

As shown in FIG. 1, the opening device generally indicated as 10 comprises a first leg means generally indicated as 12 and a second leg means generally indicated as 14. The first leg means includes a handle means 16 and an elongated blade 18. The blade extends over a substantial portion of the length of the first leg means 12 and includes a sharpened cutting edge 20 defined by the peripheral edge of blade 18 facing the second leg means 14.

The second leg means includes a second handle means 22 and an arcuate or curvilinear portion 24.

The first and second leg means are movably connected to one another by virtue of a pivot means 26 attached to the outer extremity of the curvilinear portion 24 and also interconnected to the blade 18 at a position substantially intermediate the extremities of blade 18. By virtue of this connection, the first and second leg means are movably relative to one another about pivot 26 which serves as a fulcrum point when the first and second leg means serve as levers to pry open shells or the like as will be described in detail hereinafter. The length of blade 18 and the positioning of pivot means 26 is such that a substantial portion of the blade extends beyond the pivot means 26. This blade portion 28 may be formed into a cutting point 30 wherein the cutting edge 20 extends from the cutting point 30 along the entire blade length on opposite sides of pivot means 26.

Figure 2:
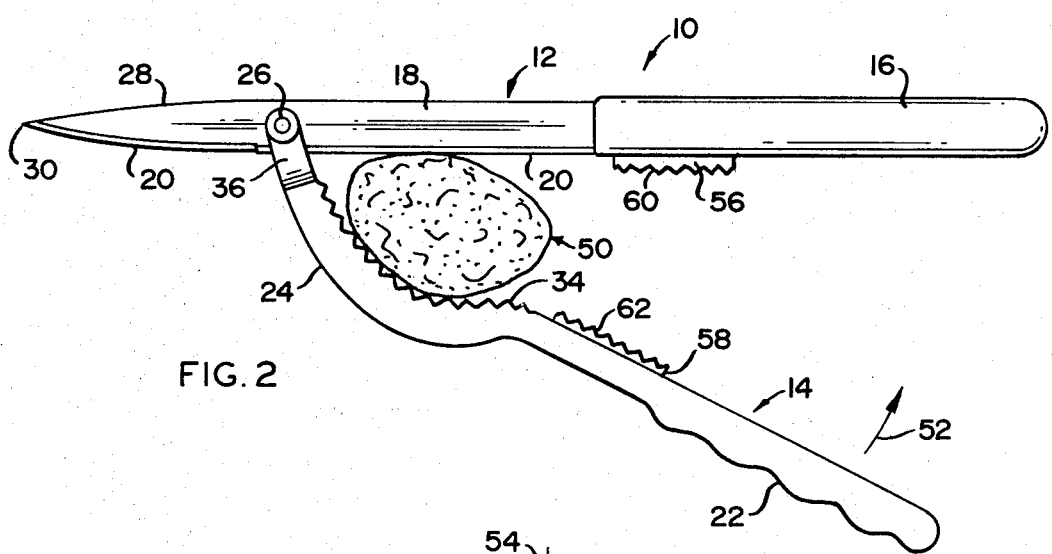
FIG. 2 is a front plan view showing the implement in its open, operative position relative to a shellfish being opened.
Figure 3:
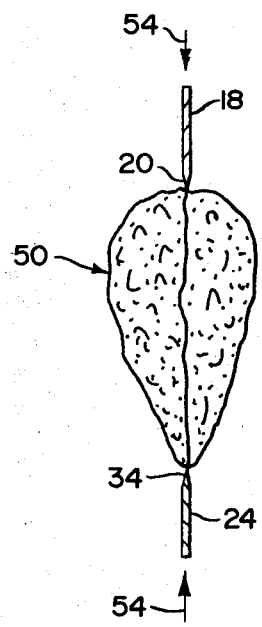
FIG. 3 is a partial sectional view showing the engagement of respective edges of the first and second leg means engaging the object being opened.

As shown in both FIGS. 1 and 2, the curvilinear portion 24 also has a cutting edge indicated as 34 and correspondingly positioned relative to the blade edge 20 in that both of these cutting edges are facing one another. More specifically, the end of curvilinear portion 24 has an indented flange 36 which again, is disposed to be interconnected between the pivot means 26 and the remainder of the curvilinear portion 24. The indentation or configuration of flange 36 is such as to allow mounting or connection of the flange to the side portion of the blade 18. This, in turn, specifically orients cutting edges 20 and 34 of the blade 18 and curvilinear portion 24 respectively in a co-planar relationship with one another as clearly shown in FIG. 3. Accordingly, when an object such as a shellfish or the like 50 is placed between the first leg means 12 and second leg means 14 such that the edges 20 and 34 are in locking engagement therewith, these edges may be placed along the "separation plan between the two shells of the object 50. Accordingly, closure of the first and second handle means relative to one another, as indicated by directional arrow 52 in FIG. 2 and directional arrows 54 in FIG. 3, provides force being directed between the shells, again as clearly shown in FIG. 3.

Additional structural features of the present invention include a cracking means in the form of an integrally formed flange 56 and 58 located on the first and second handle means 16 and 22 respectively. Each of these flanges are correspondingly positioned so as to engage one another when in a closed position as shown in FIG. 1. In addition, the mating surfaces 60 and 62 of the respective flanges may be roughened or serrated so as to insure proper gripping of any object placed therebetween.

It will thus be seen that the objects made apparent from the preceding description, are efficiently attained, and since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. An opening device designed primarily to open shellfish or the like, said device comprising: a first leg means and a second leg means attached to one another; said first leg means comprising blade means and a first handle means formed thereon, said blade means and said first handle means defining the opposite extremities of said first leg means and disposed in substantially collinear relation to one another; said blade means including a first cutting edge extending the entire length of said blade means and having a substantially linear configuration and being disposed adjacent said second leg means; pivot means mounted between opposite ends of said blade means, said pivot means interconnected between said blade means and one end of said second leg means including one end thereof defined by a curvilinear portion disposed in facing, substantially coplanar relation to said first cutting edge; said second leg means comprising a second handle means connected to said curvilinear portion; a second cutting edge having a curvilinear configuration disposed on and substantially corresponding to that of said curvilinear portion, said second cutting edge formed between said second handle means and the end of said second leg means connected to said pivot means; said first and second leg means movable between an open and closed position, said closed position defined by substantially parallel orientation of said first and second handle means, whereby said first cutting edge between said pivot means and said first handle means and second cutting edge are engageable with the approximate center of an object therebetween thereby accomplishing separation of said object about said center.

2. An opening device as in claim 1 further comprising said second cutting edge including a gripping means defining a substantially serrated edge portion formed along a predetermined length of said curvilinear portion.

3. An opening device as in claim 1 further comprising cracking means mounted on each of said first and second handle means disposed thereon in engageable relation to one another.

4. An opening device as in claim 3 wherein said cracking means comprises at least one flange element extending outwardly from said respective handle means on which they are mounted, each including substantially correspondingly configured serrated surface portions thereon, said flange element disposed into mating relation with one another when said leg means are in substantially closed position.

* * * * *

UNITED STATES PATENT OFFICE
CERTIFICATE OF CORRECTION

Patent No. 3,846,908                    Dated November 12, 1974

Inventor(s)  Joseph Allievi

It is certified that error appears in the above-identified patent and that said Letters Patent are hereby corrected as shown below:

Column 1, line 39, delete "relay" and insert -- rely --.

Column 2, line 32, delete "and", first occurrence, and insert -- the --. Column 3, line 46, delete "movably" and insert -- movable --. Column 4, line 8, after "plan" insert -- " --.

Signed and sealed this 14th day of January 1975.

(SEAL)
Attest:

McCOY M. GIBSON JR.           C. MARSHALL DANN
Attesting Officer              Commissioner of Patents